US005466101A

United States Patent [19]

Meyen

[11] Patent Number: 5,466,101

[45] Date of Patent: Nov. 14, 1995

[54] DEVICE ON HAND POWER TOOLS FOR DRIVING TOOLS

[75] Inventor: Hans-Peter Meyen, Filderstadt, Germany

[73] Assignee: Robert Bosch GmbH, Stuttgart, Germany

[21] Appl. No.: 331,345

[22] Filed: Oct. 27, 1994

[30] Foreign Application Priority Data

Nov. 30, 1993 [DE] Germany .......................... 43 40 726.9

[51] Int. Cl.[6] ............................ B23B 51/00; B23B 31/10

[52] U.S. Cl. .......................... 408/226; 279/19.4; 408/240

[58] Field of Search ................................ 408/226, 239 R, 408/240; 279/19.3, 19.4, 19.5, 19.6, 123

[56] References Cited

U.S. PATENT DOCUMENTS 4,609,199 9/1986 Rohm ..................................... 279/19.4

4,726,719 2/1988 Mack ..................................... 279/19.4

5,346,340 9/1994 Runge ..................................... 408/226

FOREIGN PATENT DOCUMENTS 2551125 5/1977 Germany .

*Primary Examiner*—Daniel W. Howell

*Attorney, Agent, or Firm*—Michael J. Striker

[57] ABSTRACT

A device for driving impact and/or drilling tools on a hand power tool has a tool with a tool shaft having at least two drive grooves which are open toward the shaft end and at least one locking trough which is closed toward the shaft end. A driver for a radially displaceable locking body of a tool receptacle engage correspondingly in each drive groove and locking trough. For strengthening the driving, the locking body is provided with an axially extending, strip-shaped radial projection which engages in a correspondingly formed depression of the locking trough of the tool shaft for forming an additional drive flank.

15 Claims, 1 Drawing Sheet

DEVICE ON HAND POWER TOOLS FOR DRIVING TOOLS

BACKGROUND OF THE INVENTION

The present invention relates to a device on a hand power tool for driving impact and/or drilling tools, as well as to a tool and a tool holder used for such a device.

German reference DE-OS 25 51 125 discloses a device of the above mentioned type, in which in the receiving opening of a tool holder two opposite drive strips are provided and engage in corresponding drive grooves in the shaft of the tool used in the device. Moreover, two locking bodies which are also located opposite to one another but are offset relative to the drive strips by substantially 90° are provided. They engage radially in corresponding elongated troughs in the tool shaft and the axially displaceable tool, for example an impact drill or a chisel is secured against falling out or unintentional withdrawal.

Since this insertion system which is known as "SDS-plus" is used for impact drills and hammer drills as well as for the tools inserted in them and having different power, a uniform shaft diameter of approximately 10 mm is provided for the required compatibility of different tools. This however has the disadvantage that the high power tools in corresponding high power machines can be used only to a limited extent for a continuous operation, since the drivers are worn out fast. Then the torque transmission is performed only through two relatively small, opposite flanks of the drive grooves and the drive strips known also as drivers.

SUMMARY OF THE INVENTION

Accordingly, it is an object of the present invention to provide an device on hand power tools for driving tools as well as a tool and a tool holder, which avoid the disadvantages of the prior art.

In keeping with these objects and with others which will become apparent hereinafter, one feature of the present invention resides, briefly stated, in a device of the above mentioned general type in which the at least one locking body on its region engaging in the at least one locking trough of the tool shaft has an axially extending, strip-shaped radial projection which engages in a corresponding depression of at least one locking trough for forming an additional drive flank, wherein the axial length of the depression is dimensioned so that the radial projection of the locking body does not come to abutment at least at a rear axial end of the depression.

When on the above mentioned tools with a so-called "SDS-plus" insertion end the shaft diameter as well as the diameter of the tool receptacle is predetermined, the inventive device for driving impact and/or drilling tools with the new features specified hereinabove provides the advantage that it is substantially in view of the strip-shaped radial projection of at least one locking body and the corresponding depression in the at least one locking trough of the tool shaft, so that the wear of the drive is reduced in high power machines and tools.

In accordance with a further feature of the present invention, a tool is provided for the arrangement of the above type, in which at least one locking trough has an axially extending, groove-shaped radial depression which is closed at least at the rear end for forming an additional drive flank. Finally, it is another feature of the present invention to provide a tool holder in which at least one locking body is axially longer than wider, and on its radially inner, convexly curved surface has an axially extending, strip-shaped radial projection for forming an additional drive flank. These features provide an improved tool shaft not only for a tool receptacle specified hereinabove, but also for machines with a "SDS-plus" tool receptacle without affecting the same, or in other words in a compatible way.

It is further advantageous that the axial locking of the tool due to the improved drive means is not affected, and thereby remains completely operative. Moreover, due to the axially greater engaging length of at least one locking body in the locking trough of the tool shaft when compared with the known locking balls, the tool guidance is improved and provides advantages especially during lateral withdrawal or lifting of the tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

An inventive device on hand power tools for driving impact and/or drilling tools, in particular on impact drilling tools or hammer drills or impact devices, has substantially a tool holder 10 and a tool shaft 11 of a tool for drilling and/or impacting. The tool shaft 11 is inserted in the tool holder 10.

Figure 1:
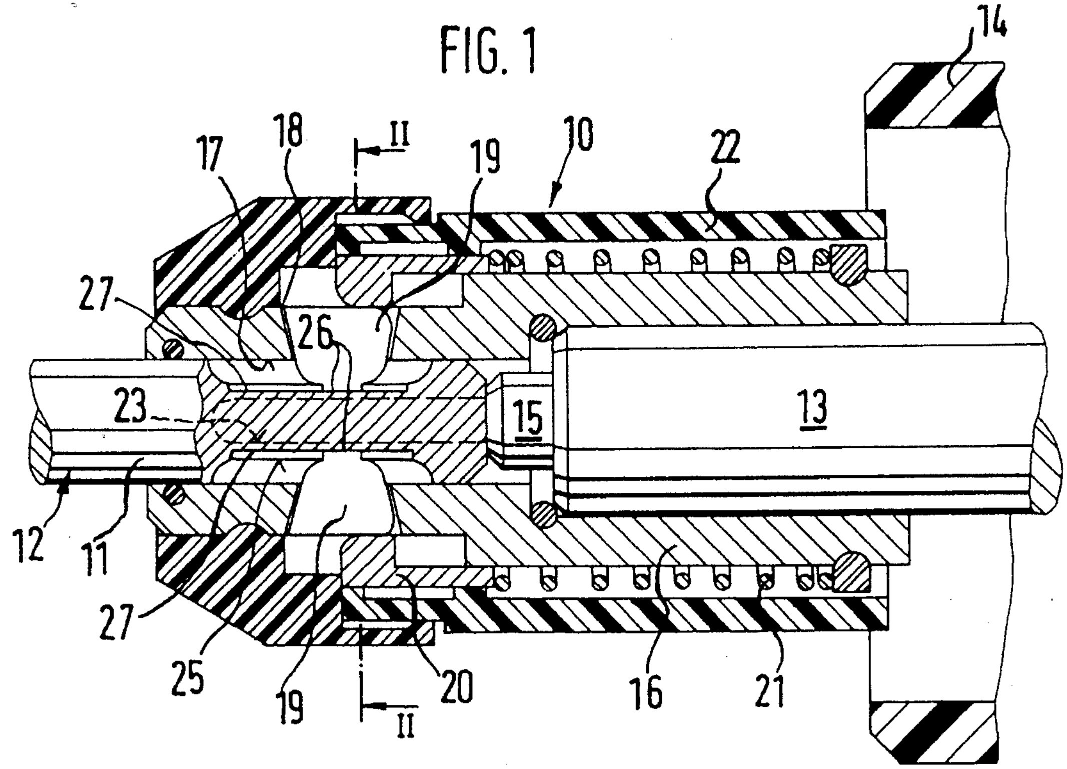
FIG. 1 is a view showing a tool holder of a hammer drill with a tool inserted in it in a longitudinal section on an enlarged scale, of the inventive device.
Figure 2:
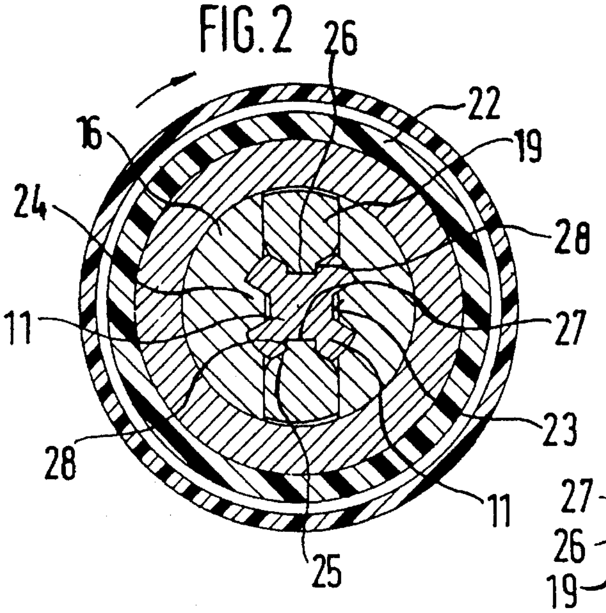
FIG. 2 is a view showing a cross-section of the tool holder of FIG. 1 taken along the line II—II.

In the first embodiment of FIGS. 1 and 2, the tool holder 10 is mounted non-rotatably on the end of a driven hollow cylindrical tool spindle 13 of a hammer drill 14. An anvil 15 is axially movably guided in the working spindle 13 and is cyclically impacted in a known manner by an impact mechanism at the end side of the tool shaft 11. The tool holder 10 includes substantially a tubular tool receptacle 16 with a receiving opening 17 for the tool shaft 11, and locking bodies 19 accommodated in recesses 18 of the tool receptacle 16. An arresting sleeve 20 is arranged above the locking bodies 19, concentrically to them. In its shown rest position under the action of a pressure spring 21 it locks the locking bodies 19 in their shown rest position. A displacing sleeve 22 fixedly connected with the arresting sleeve 20 is composed of synthetic plastic material. It concentrically surrounds the arresting sleeve 20 and the pressure spring 21 and can be displaced axially by hand against the force of the pressure spring 21. Thereby the locking bodies 19 are released to perform their radial movement, so that during insertion of the tool shaft 11 they can deviate radially outwardly.

The tool 12 is provided on the tool shaft 11 with two opposite drive grooves 23 which is open toward the shaft end. Two axially extending opposite drivers 24 project inwardly into the receiving opening 17 and engage in the drive grooves 23. The drivers 24 are offset in a peripheral direction of the tool receptacle 16 by 90° relative to the locking bodies 19. Correspondingly, two opposite axially extending locking troughs 25 are provided on the periphery of the tool shaft 11 and offset by 90° relative to the drive grooves 23 of the tool shaft 11. The locking troughs 25 end before the rear end of the tool shaft 11, so that the locking bodies 19 which engage in them limit the axial movement of the tool 11 in the tool receptacle 16. After the displacement of the thusly formed tool shaft 11 into the tool receptacle 16, the displacing sleeve 22 is again released and the pressure spring 21 presses the arresting sleeve 20 with the displacing sleeve 20 axially forwardly. The locking bodies 19 engage radially into the locking troughs 25 and locked by the arresting sleeve 20 in this position so that the tool 12 is secured against falling out.

For improving the driving, a strip-shaped radial projection 26 is formed on the locking bodies 19. It extends axially on the inner side of the region which engages in the corresponding locking trough 25 of the tool shaft 11. Correspondingly, a matching depression 27 is formed in the bottom of the locking trough 25. The axial length of this depression is dimensioned so that the radial projection 26 of the locking body 19 does not come to abutment against the axial ends of the depressions 27 during an axial displacement of the tool shaft 11 in the tool receptacle 16. Moreover, in this case the front and rear rounded end sides of the locking bodies 19 abut against the correspondingly rounded ends of the locking troughs 25.

The substantially radial and axial flatly extending flanks 28 of the radial projections 26 and the depressions 27 located in the rotary direction form an additional driving means. In order not-to affect the operation of the locking bodies 19 during the axial locking of the tool shaft 11, the radial projection 26 is shorter and substantially only half wide as the locking body 19 in the engaging region on the locking troughs 25. In the same way, also the depression 27 in the locking troughs 25 is shorter and smaller than those. The depression 27 located in the center of the locking troughs 25, similarly to the radial projection 26 of the locking body 19 has a rectangular cross-section.

It can be seen from FIGS. 1 and 2 that the locking body 19 is axially longer than wider and is convexly curved on its radial inwardly located surface. The strip-shaped radial projection 26 is formed in the center of the curved surface so as to extend axially and has a rectangular cross-section. An optimal driving of the tool shaft 11 is obtained in that the shaft 11 is inserted as deep as possible into the receiving openings 17. This insertion length can be optimally used also for the position of the locking body 19 and the projection 26 for additional driving on the locking bodies 19, in that the front end of the locking body 19 and the drive strip 24 are located at the same axial height. By inclines on the ends of the radial projection 26, the insertion or withdrawal of the shaft 11 from the tool receptacle 16 is facilitated.

Figure 3:
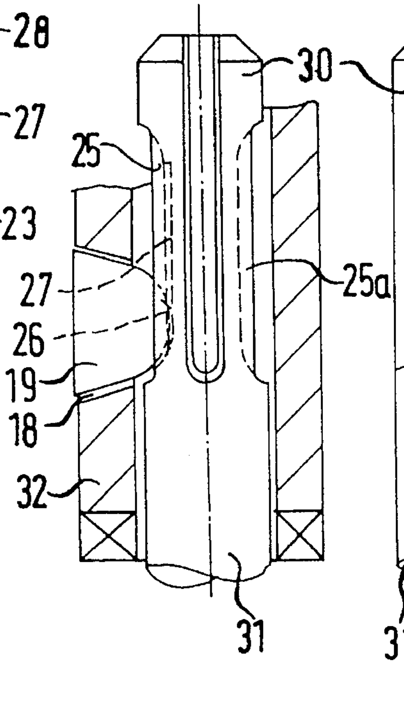
FIG. 3 is a view showing a second embodiment of a tool holder with the inserted tool in a longitudinal section.
Figure 4:
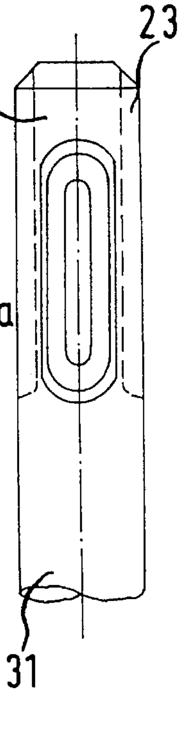
FIG. 4 shows the view of the tool shaft which is turned by 90° relative to the view of FIG. 3.

In the second embodiment in FIGS. 3 and 4 a tool shaft 30 of a drilling and/or impacting tool 31 is shown turned by 90°, while in FIG. 3 the tool receptacle 32 of the tool holder is shown only schematically. The substantial difference of the second embodiment relative to the first embodiment is that, instead of two opposite locking bodies 19, only one locking body 19 is provided in a recess 18 of the tool receptacle 32. Such a cost-favorable solution is also recommended when the tool and the utilized hand power tool are not designed for high powers. Moreover, the greater cross-sectional surface of the tool shaft 30 is advantageous for a shock wave loading and torque transmission to the tool.

Since the second flank of the depression 7 or the radial projection 26 located opposite to the additional driver flank 28 has no driving function, it can be designed differently if needed.

Figure 5:
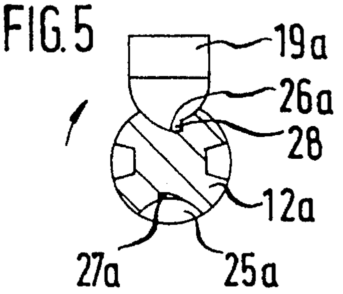
FIG. 5 is a view schematically showing a third embodiment.

FIG. 5 shows such an embodiment schematically. There the radial projection 26*a* on the locking body 19*a* is provided only in the rotary direction with a lateral flank 28 as an additional driving means, while the opposite side is flattened. The radial projection 26*a* has here a tooth-shaped cross-section which engages in a correspondingly formed depression 27*a* in the locking trough 25*a* of the tool shaft 12*a*.

Within the basic ideas of the invention it is not required to make the depression in the locking trough matching with the radial projections on the locking bodies. It is important however that the radial projections 26 and the depression 27 form an additional driving flank in a rotary direction, against which these parts flatly contact for a torque transmission.

It will be understood that each of the elements described above, or two or more together, may also find a useful application in other types of constructions differing from the types described above.

While the invention has been illustrated and described as embodied in a device for driving impact and/or drilling tools on hand power tools and a tool and a tool holder provided for the device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for driving impact and/or drilling tools on hand power tools, comprising a tool having a shaft with a shaft end, said tool having grooves which are open toward said shaft end and at least one locking trough provided in said shaft; a tool holder having a tool receptacle with a receiving opening, at least two axially extending drivers projecting radially in said receiving opening and engaging in said grooves of said tool, and at least one radial throughgoing opening provided in said tool receptacle in a peripheral region which is offset relative to said drivers and accommodating an outwardly movable locking body which engages in said locking trough, said at least one locking body being provided in a region which engages said at least one locking trough of said tool with an axially extending, strip-shaped radial projection, while said at least one locking trough is provided with a corresponding depression in which said radial projection engages for forming an additional drive flank, said depression having an axial length dimensioned so that said radial projection of said locking body comes to abutment at least at a rear axial end of said depression.

2. A device as defined in claim 1, wherein said drivers are located diametrically opposite to one another.

3. A device as defined in claim 1, wherein said radial projection of said at least one locking body and said depression of said at least one locking trough is shorter and smaller than said locking body and said locking trough correspondingly.

4. A device as defined in claim 1, wherein said radial projection of said at least one locking body form with said depression of said at least one locking trough a substantially radial and axial flatly extending additional drive flank.

5. A device as defined in claim 1, wherein a front end of said driver and said at least one locking body and also of said drive groove and said at least one locking trough correspondingly are located substantially at a same axial height.

6. A tool for a device for driving impact and/or drilling tools on hand power tools having a tool holder with at least two axially extending drivers projecting inwardly from a receiving opening of a tool receptacle of the tool holder and also having a radial throughgoing opening for receiving a locking body provided with an axially extending, strip-shaped radial projection, the tool comprising a tool shaft having a shaft end; grooves which open toward said shaft end and in which said drivers engage; an elongated locking trough provided in said tool shaft in which said locking body engages for limiting an axial movement of the tool, said at least one locking trough being provided with an axially extending, groove-shaped radial depression which is closed at least at a rear end and in which said radial projection engages for forming an additional drive flank.

7. A tool as defined in claim 6, wherein said depression is located in a center of said at least one locking trough and has a rectangular cross-section with said additional drive flank which is substantially radially and axially flat.

8. A tool as defined in claim 6, wherein said depression has a length and a width which is shorter and smaller correspondingly than a length and a width of said locking trough.

9. A tool as defined in claim 6, wherein a front end of said drive groove with a front end of said at least one locking trough are located on a same axial height of said tool shaft.

10. A tool as defined in claim 6, wherein two of said locking troughs are provided and located substantially diametrically opposite to one another with a corresponding one of said depressions formed in a bottom of a corresponding one of said locking troughs.

11. A tool holder for a device for driving impact and/or drilling tools on hand power tools having a tool with a tool shaft and a shaft end as well as with grooves which are open toward the shaft end and with an elongated locking trough provided in the tool shaft and having a depression, the tool holder comprising a tool receptacle having an axial receiving opening and a radial throughgoing opening; and at least one locking body located outwardly movable in said throughgoing opening and provided with an axially extending, strip-shaped radial projection engageable in the depression of the locking trough of the tool so as to form an additional drive flank.

12. A tool holder as defined in claim 11, wherein said at least one locking body is axially longer than wider and has a radially inwardly located convexly curved surface provided with said radial projection.

13. A tool holder as defined in claim 11, wherein said radial projection has a rectangular cross-section with said additional drive flank which is formed in a rotary direction as a lateral additional axial flat flank.

14. A tool holder as defined in claim 11, wherein said radial projection is shorter and smaller than said locking body.

15. A tool holder as defined in claim 11, wherein said locking body and said driver has a front end located substantially at the same axial height.

* * * * *